United States Patent
Stockmaster et al.

(10) Patent No.: US 12,040,888 B2
(45) Date of Patent: Jul. 16, 2024

(54) JAMMER DETECTION SYSTEM

(71) Applicant: BAE SYSTEMS Information and Electronic Systems Integration Inc., Nashua, NH (US)

(72) Inventors: Michael H. Stockmaster, Edgemont, SD (US); Ying Cho J. Lai, Hiawatha, IA (US); Aaron P. Shaffer, Cedar Rapids, IA (US); Ryan D. Downey, Cedar Rapids, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 130 days.

(21) Appl. No.: 17/991,435

(22) Filed: Nov. 21, 2022

(65) Prior Publication Data

US 2024/0171300 A1   May 23, 2024

(51) Int. Cl.
*H04K 3/00* (2006.01)
*G01S 3/04* (2006.01)
(Continued)

(52) U.S. Cl.
CPC .............. *H04K 3/822* (2013.01); *G01S 3/043* (2013.01); *G06N 3/08* (2013.01); *H04K 3/88* (2013.01); *G01S 7/021* (2013.01)

(58) Field of Classification Search
CPC .......... H04K 3/822; H04K 3/88; G01S 4/043; G01S 7/021; G06N 3/08
(Continued)

(56) References Cited

U.S. PATENT DOCUMENTS 10,505,648 B1   12/2019   Lundquist et al.
2013/0101073 A1*  4/2013   Zai ................. G01S 7/0232
                                                    375/349
(Continued)

FOREIGN PATENT DOCUMENTS

WO   2010/062418 A2   6/2010

OTHER PUBLICATIONS

International Search Report, PCT/US23/80193, mailed Apr. 4, 2024, 10 pages.

*Primary Examiner* — Bo Fan
(74) *Attorney, Agent, or Firm* — Scott J. Asmus; Gary McFaline (57) ABSTRACT

Techniques are provided for jammer detection. A methodology implementing the techniques according to an embodiment includes estimating an angle of arrival of a jamming signal, the jamming signal included in a received signal, and generating a direction finding (DF) confidence indicator associated with the estimated angle of arrival. The method also includes extracting the jamming signal from the received signal. The method further includes correlating the extracted jamming signal with previously extracted jamming signals to generate a correlation score and using the correlation score as a uniqueness assessment of the extracted jamming signal. The method further includes identifying characteristics of the extracted jamming signal and generating a characterization confidence indicator. The method further includes demoting the extracted jamming signal to non-jammer status based on one or more of the DF confidence indicator, the uniqueness assessment, and the characterization confidence indicator.

20 Claims, 9 Drawing Sheets

(51) Int. Cl.
 *G01S 7/02* (2006.01)
 *G06N 3/08* (2023.01)
(58) Field of Classification Search
 USPC .................................. 342/16, 173, 368, 450
 See application file for complete search history.

(56) References Cited

U.S. PATENT DOCUMENTS

2016/0266236 A1\* 9/2016 Kang .................... H04B 1/7102
2017/0261615 A1\* 9/2017 Ying ........................ H04K 3/90

\* cited by examiner

JAMMER DETECTION SYSTEM

FIELD OF DISCLOSURE

The present disclosure relates to jammer detection systems, and more particularly, to a jammer detection system with improved probability of detection and reduced probability of false alarm.

BACKGROUND

Situational awareness is an important aspect of military operations, and operations in other conflict scenarios, and often includes direction finding (DF) for sources of signal jammers. DF techniques, however, may produce false alarms (e.g., an indication of jamming signal sources that are not real). These false alarms can distract from real threats, burden processing systems and operators of those systems, and potentially result in unintended actions with undesired consequences.

Although the following Detailed Description will proceed with reference being made to illustrative embodiments, many alternatives, modifications, and variations thereof will be apparent in light of this disclosure.

DETAILED DESCRIPTION

Techniques are provided herein for detection of jammer signals with reduced probability of false alarm (Pfa) and improved probability of detection (Pd). As described above, accurate and reliable direction finding of jammer signals can improve situational awareness, but false alarms can distract from real threats and can negatively impact operations. While detection improvements can be achieved through the deployment of multiple cooperating DF platforms (e.g., in a multi-ship, multi-platform scenario), this approach adds significant cost and complexity and relies on the ability to coordinate and communicate between platforms, which may be difficult or impossible in some hostile environments.

To this end, techniques are provided to improve jammer signal detection. In an example, the improvement manifests with respect to a reduction in false alarms, and can be accomplished using data provided from a single sensor (e.g., an antenna or beamforming array), without requiring information or assistance from other platforms or outside sources. In some embodiments, the disclosed jammer signal detection techniques include jammer direction finding, jammer isolation, and jammer characterization, with each of those processes generating an associated confidence indicator and/or uniqueness assessment that can be used to filter out detections that are more likely to be false alarms, as will be described in greater detail below. Additionally, a number of thresholding parameters can be set to balance or otherwise adjust or tune the Pfa and Pd of the system, depending on given mission requirements or needs of the system operators.

For example, a system to implement the disclosed techniques can be hosted on, or otherwise be incorporated into the electronic systems of an aircraft or other vehicle, a navigation system, an anti jamming system, a tracking ground station, a personal computer, workstation, laptop computer, tablet, touchpad, portable computer, handheld computer, cellular telephone, smartphone, embedded system, or any other platform where jamming detection is needed. In accordance with an embodiment, a methodology to implement these techniques includes estimating an angle of arrival of a jamming signal that may be present in a received signal, and generating a DF confidence indicator associated with the estimated angle of arrival. The method also includes extracting the jamming signal from the received signal, and correlating the extracted jamming signal with previously extracted jamming signals to generate a correlation score and using the correlation score as a uniqueness assessment of the extracted jamming signal. The method further includes identifying characteristics of the extracted jamming signal and generating a characterization confidence indicator. The method further includes, for example, filtering the extracted jamming signal from a report of detected signal jammers (or otherwise demoting the extracted jamming signal to a non-jammer status) based on one or more of the DF confidence indicator, the uniqueness assessment, and the characterization confidence indicator.

It will be appreciated that the techniques described herein may provide improved jammer signal detection with reduced false alarms, compared to existing techniques that do not generate and exploit confidence indicators associated with one or more of the detection processes. The techniques disclosed herein may further be implemented in hardware or software or a combination thereof. Numerous embodiments and applications will be apparent in light of this disclosure.

System Architecture

Figure 1:
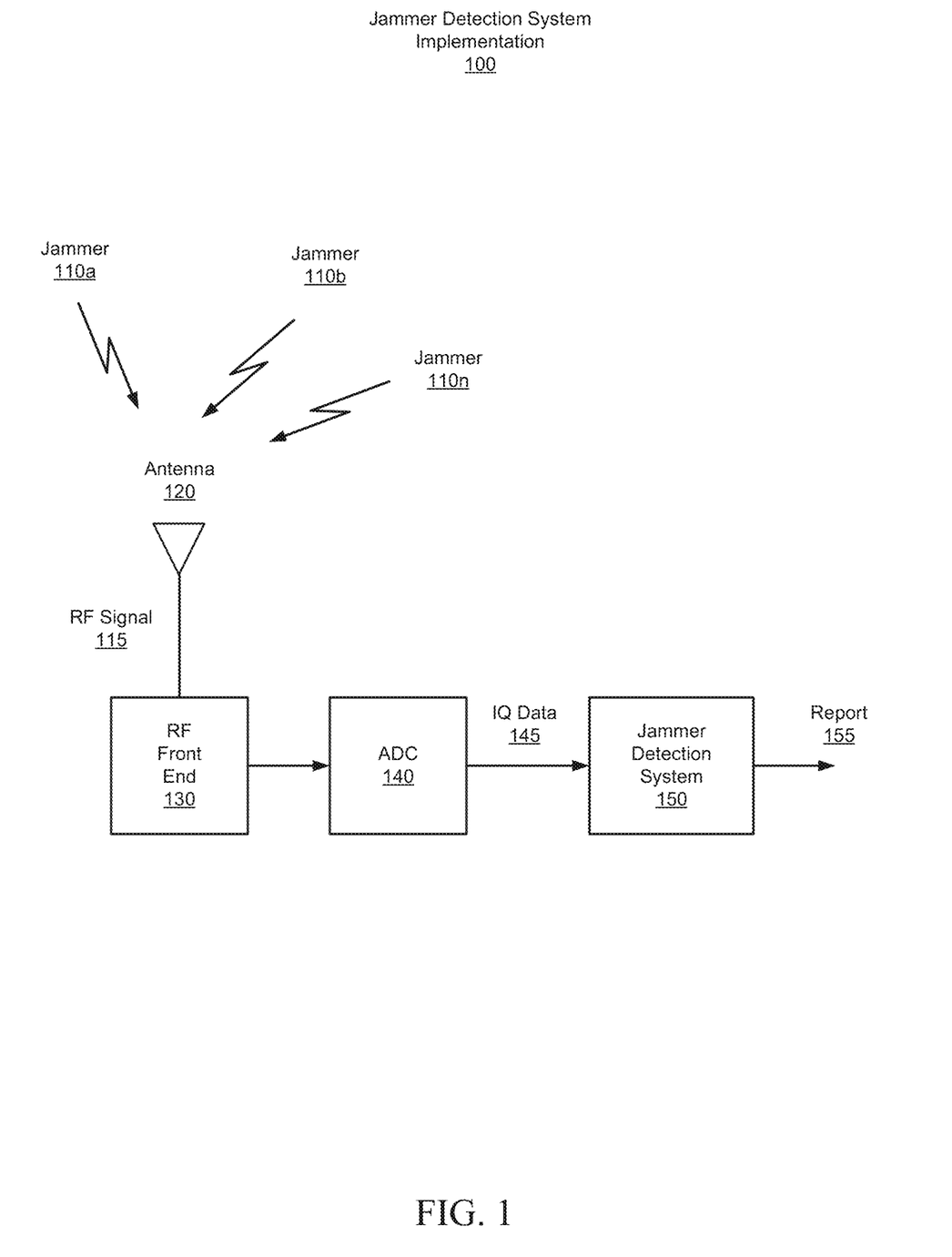
FIG. 1 illustrates an implementation of a jammer detection system, in accordance with certain embodiments of the present disclosure.

FIG. 1 illustrates an implementation 100 of a jammer detection system 150, in accordance with certain embodiments of the present disclosure. As shown in this implementation, antenna 120 is configured to receive radio frequency (RF) signals from any number of sources which may include, for example, signal jammers 110a, 110b, ... 110n. In some embodiments, antenna 120 may be configured as a beamforming array or other such type of antenna having directional or steering capabilities. The antenna 120 provides the received RF signal 115 to an RF front end 130 that, in some embodiments, is configured to convert the received RF signal down to an intermediate frequency (IF) signal or a baseband signal and perform any suitable filtering and amplification. An analog to digital converter (ADC) 140 is configured to convert the analog signal provided by the RF front end into a digital signal comprising in-phase and quadrature data samples (IQ data) 145 for use by the jammer detection system 150 to generate reports 155 of detected jammers, as will be described in greater detail below.

Figure 2:
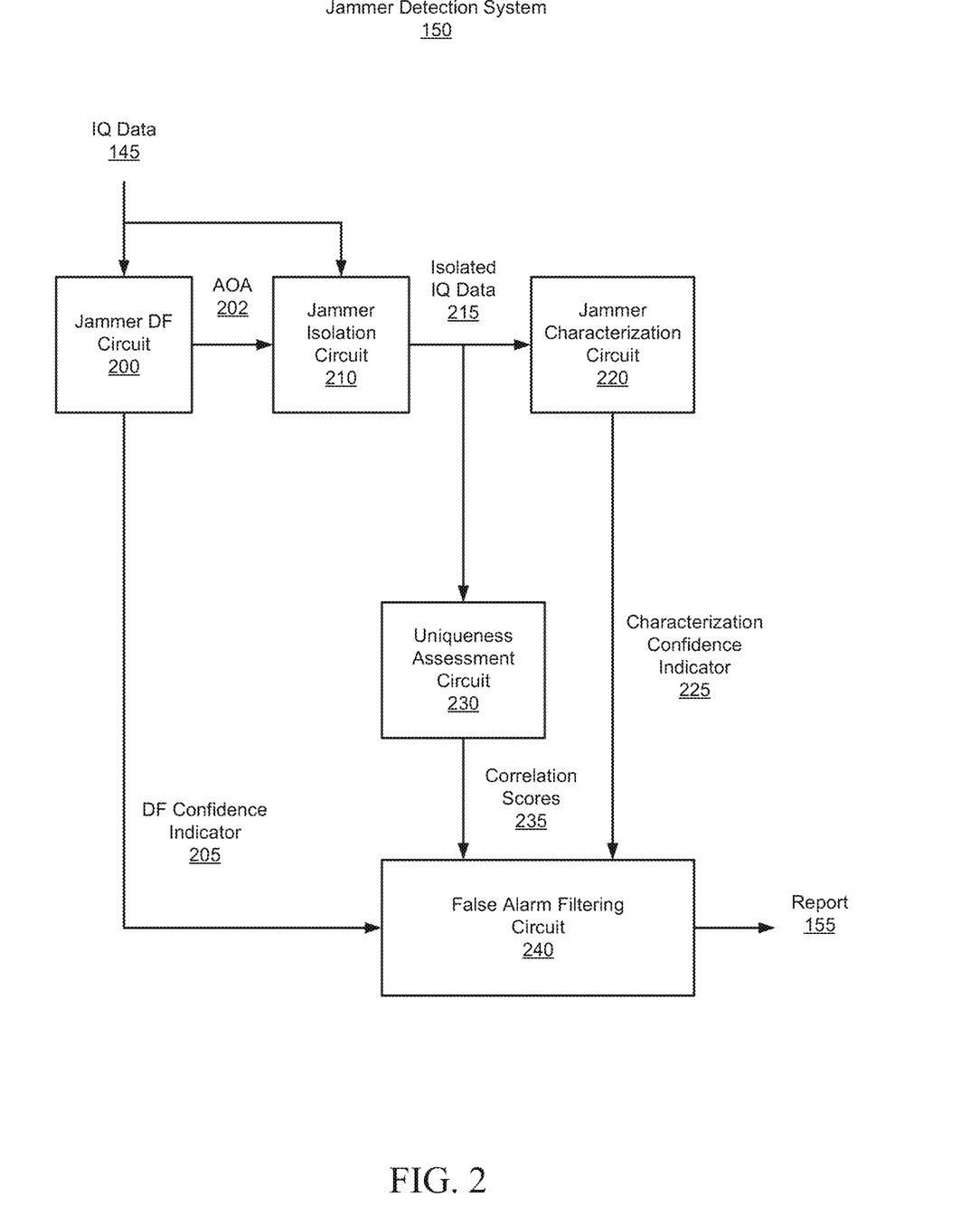
FIG. 2 is a block diagram of the jammer detection system of FIG. 1, configured in accordance with certain embodiments of the present disclosure.

FIG. 2 is a block diagram of the jammer detection system 150 of FIG. 1, configured in accordance with certain embodiments of the present disclosure. The jammer detection system is shown to include a jammer DF circuit 200, a jammer isolation circuit 210, a jammer characterization circuit 220, a jammer uniqueness assessment circuit 230, and a false alarm filtering circuit 240.

The jammer DF circuit 200 will be described in detail below, but at a high level it is configured to estimate an angle of arrival 202 of a jamming signal that is included in the received signal (IQ data 145), and to generate a DF confidence indicator 205 associated with the estimated angle of arrival.

The jammer isolation circuit 210 will be described in detail below, but at a high level it is configured to extract the jamming signal (isolated jammer IQ data 215) from the received signal (IQ data 145) based on the estimated angle of arrival 202.

The jammer characterization circuit 220 will be described in detail below, but at a high level it is configured to identify characteristics 520 of the extracted jamming signal 215 and generate a characterization confidence indicator 225.

The jammer uniqueness assessment circuit 230 will be described in detail below, but at a high level it is configured to correlate the extracted jamming signal 215 with previously extracted jamming signals to generate correlation scores 235 for use as a uniqueness assessment of the extracted jamming signal.

The false alarm filtering circuit 240 will be described in detail below, but at a high level it is configured to demote the extracted jamming signal to a non-jammer status so that the signal can be ignored or passed downstream for further processing as deemed necessary. In some cases, the false alarm filtering circuit 240 is configured to filter the extracted jamming signal 215 from a report 155 of detected signal jammers based on one or more of the DF confidence indicator 205, the uniqueness assessment (correlation scores) 235, and the characterization confidence indicator 225. The report may be, for example, a visual display of candidate signals each currently assigned with jammer status.

Figure 3:
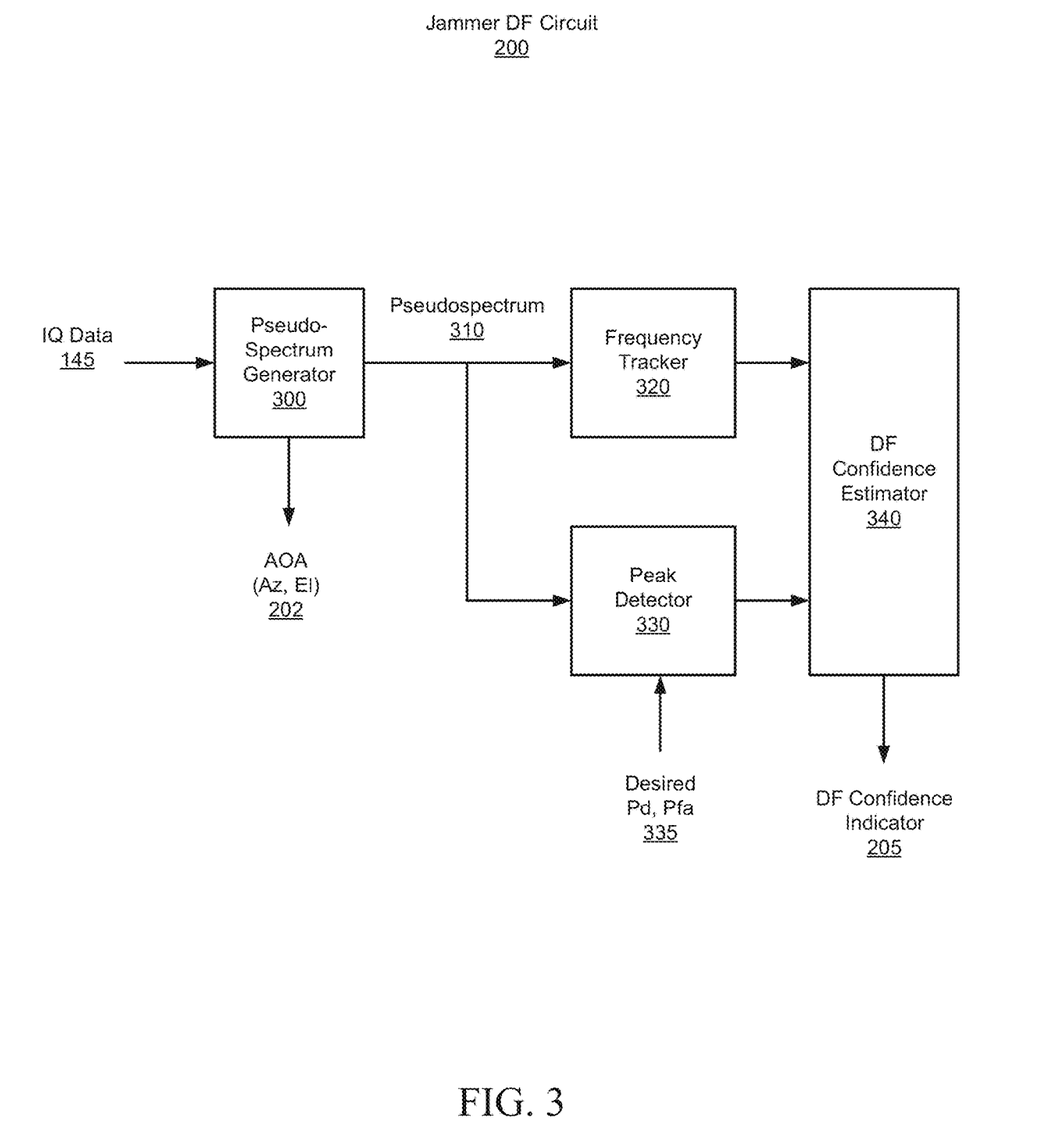
FIG. 3 is a block diagram of the jammer DF circuit of FIG. 2, configured in accordance with an embodiment of the present disclosure.

FIG. 3 is a block diagram of the jammer DF circuit 200 of FIG. 2, configured in accordance with an embodiment of the present disclosure. The jammer DF circuit 200 is shown to include a pseudospectrum generator 300, a frequency tracker 320, a peak detector 330, and a DF confidence estimator 340.

The pseudospectrum generator 300 is configured to generate a pseudospectrum 310 of the received signal. The angle of arrival (e.g., an azimuth and elevation) 202 of the jamming signal, that is present in the IQ data 145 of the received signal, is estimated from the pseudospectrum. In some embodiments, the multiple signal classification (MUSIC) algorithm is used to generate the pseudospectrum 310 and estimate the angle of arrival 202, although any suitable technique may be used in light of the present disclosure.

The frequency tracker 320 is configured to track frequencies of the jamming signal in the pseudospectrum for use by the DF confidence estimator 340. For example, if a jamming signal is detected in a particular frequency range in a relatively consistent manner it may be more likely to be a real jamming signal rather than a false alarm.

The peak detector 330 is configured to detect peaks associated with the jamming signal in the pseudospectrum for use by the DF confidence estimator 340. In some embodiments, the peaks may be detected based on a comparison of pseudospectrum values to a peak threshold value. The peak threshold value may be selected based on a desired Pfa and/or a desired Pd. A higher peak threshold, for example, may make it less likely for a peak to be recognized which may decrease the Pfa, but also decrease the Pd.

The DF confidence estimator 340 is configured to generate the DF confidence indicator based on the frequency tracking and the detected peaks. For example, strong peaks with consistent frequency tracks may be given higher DF confidence scores.

Figure 4:
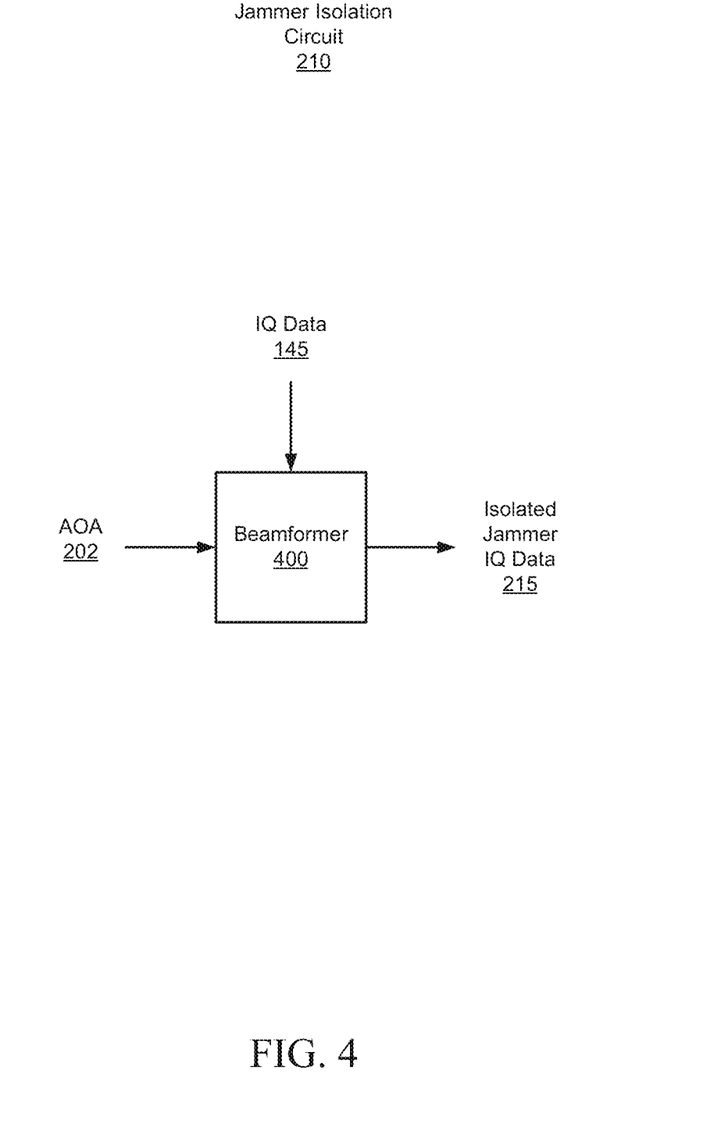
FIG. 4 is a block diagram of the jammer isolation circuit of FIG. 2, configured in accordance with an embodiment of the present disclosure.

FIG. 4 is a block diagram of the jammer isolation circuit 210 of FIG. 2, configured in accordance with an embodiment of the present disclosure. The jammer isolation circuit 210 is shown to include a beamformer 400. The beamformer 400 is configured to steer a beam in the direction of the estimated angle of arrival 202 of the jamming signal to extract the jamming signal. The output of the beamformer 400 is the isolated jammer IQ data 215. Such extracted signals initially may be assigned a status of jammer signal, which may be subsequently confirmed or changed to non-jammer status.

Figure 5:
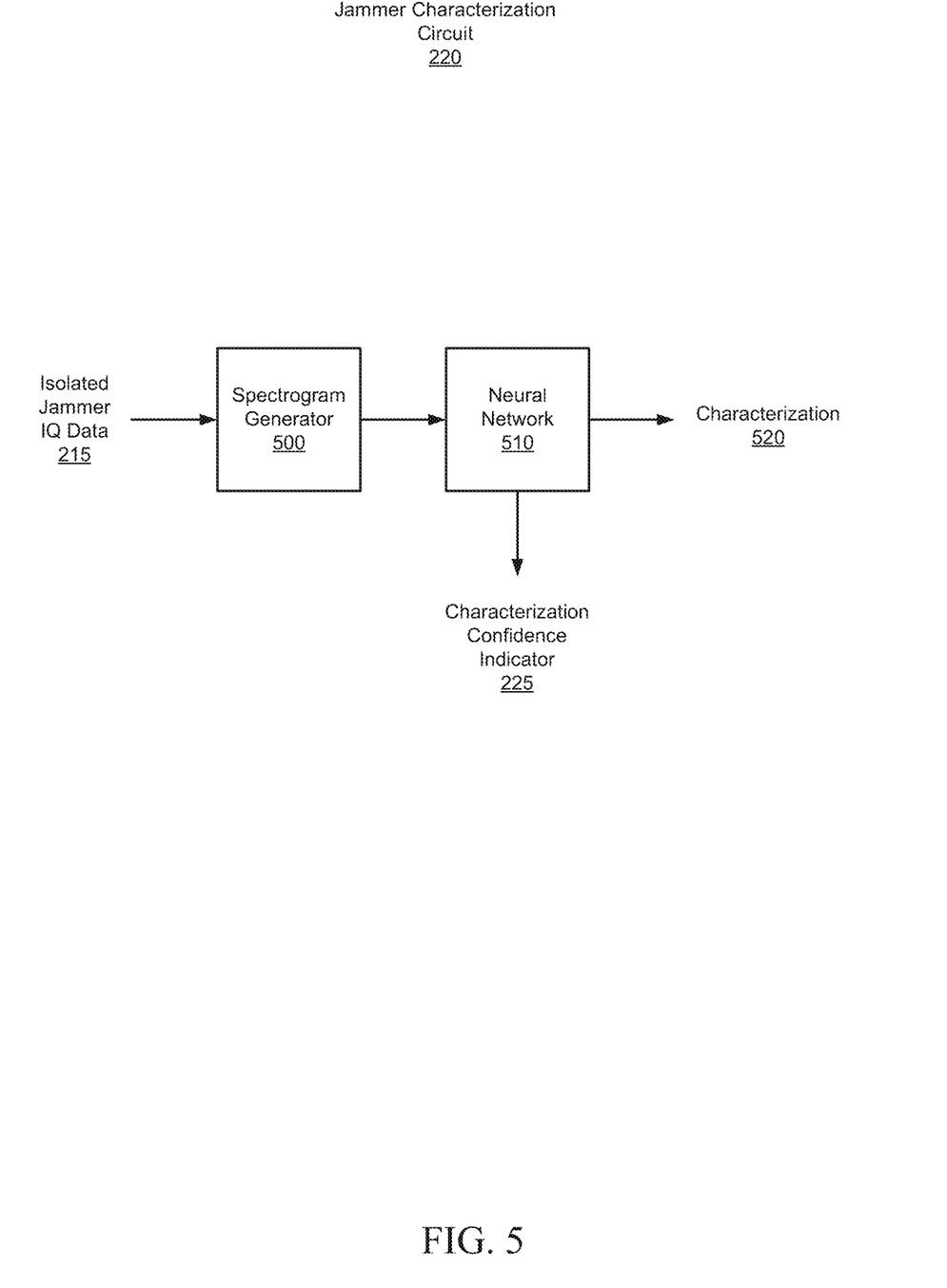
FIG. 5 is a block diagram of the jammer characterization circuit of FIG. 2, configured in accordance with an embodiment of the present disclosure.

FIG. 5 is a block diagram of the jammer characterization circuit 220 of FIG. 2, configured in accordance with an embodiment of the present disclosure. The jammer characterization circuit 220 is shown to include a spectrogram generator 500 and an artificial neural network 510.

The spectrogram generator 500 is configured to generate a spectrogram of the extracted jamming signal 215. In some embodiments the spectrogram may be generated by performing fast Fourier transforms (FFTs) on the IQ data 215, although any suitable technique may be used in light of the present disclosure.

The artificial neural network 510 is configured (e.g., trained) to classify the extracted jamming signal 215, based on the spectrogram, to identify the characteristics 520 of the extracted jamming signal. For example, the neural network may classify the jamming signal in the most general sense as being broadband or narrowband. In some embodiments, the neural network may provide more detailed classification, for example, an identification of a specific type of jammer source based on knowledge of the characteristics of different jammer sources that had been used to train the neural network. The neural network is also configured to generate a classification score for use as part of the characterization confidence indicator 520. In some embodiments, the power of the extracted jamming signal may also be used as part of the characterization confidence indicator. Any suitable type of artificial neural network and associated training procedure may be used in light of the present disclosure.

Figure 6:
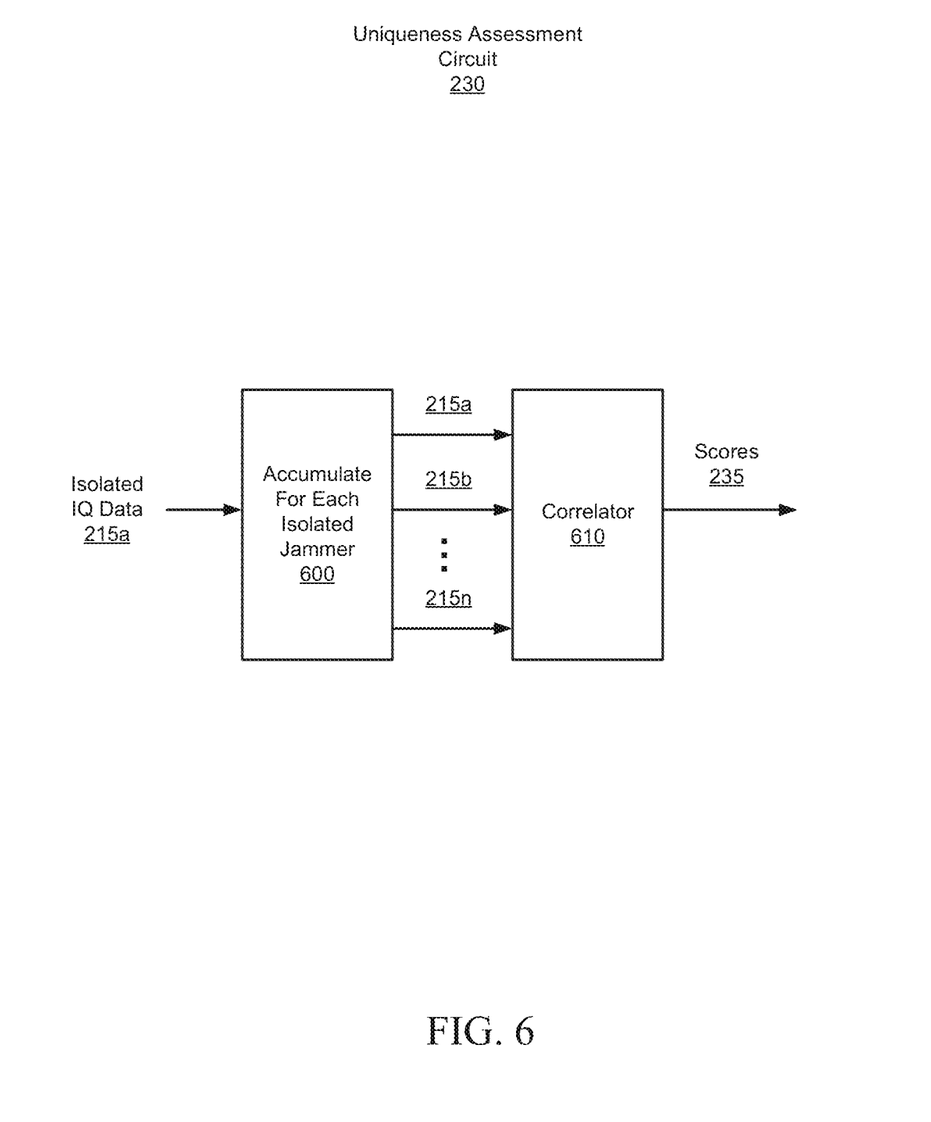
FIG. 6 is a block diagram of the uniqueness assessment circuit of FIG. 2, configured in accordance with an embodiment of the present disclosure.

FIG. 6 is a block diagram of the uniqueness assessment circuit 230 of FIG. 2, configured in accordance with an embodiment of the present disclosure. The uniqueness assessment circuit 230 is shown to include an accumulator 600 and a correlator 610.

The accumulator 600 is configured to accumulate (e.g., store over time) the isolated IQ data $215a$, $215b$, . . . $215n$ for each jammer signal under consideration.

The correlator 610 is configured to correlate the current isolated IQ data $215a$ against one or more of the accumulated IQ data streams $215b$, . . . $215n$. Each correlation operation generates a score 235 (e.g., the value of the peak of the correlation). The score may be normalized to a value between zero and one, where one indicates a high degree of correlation. If two IQ data signals, for example 215a and 215b, are highly correlated, that would tend to indicate that they are duplicate signals, which can occur as an artifact of the DF algorithm (e.g., caused by sympathetic nulls or imperfections in the data), and so one of them may be rejected by the false alarm filtering circuit 240, as described below.

Figure 7:
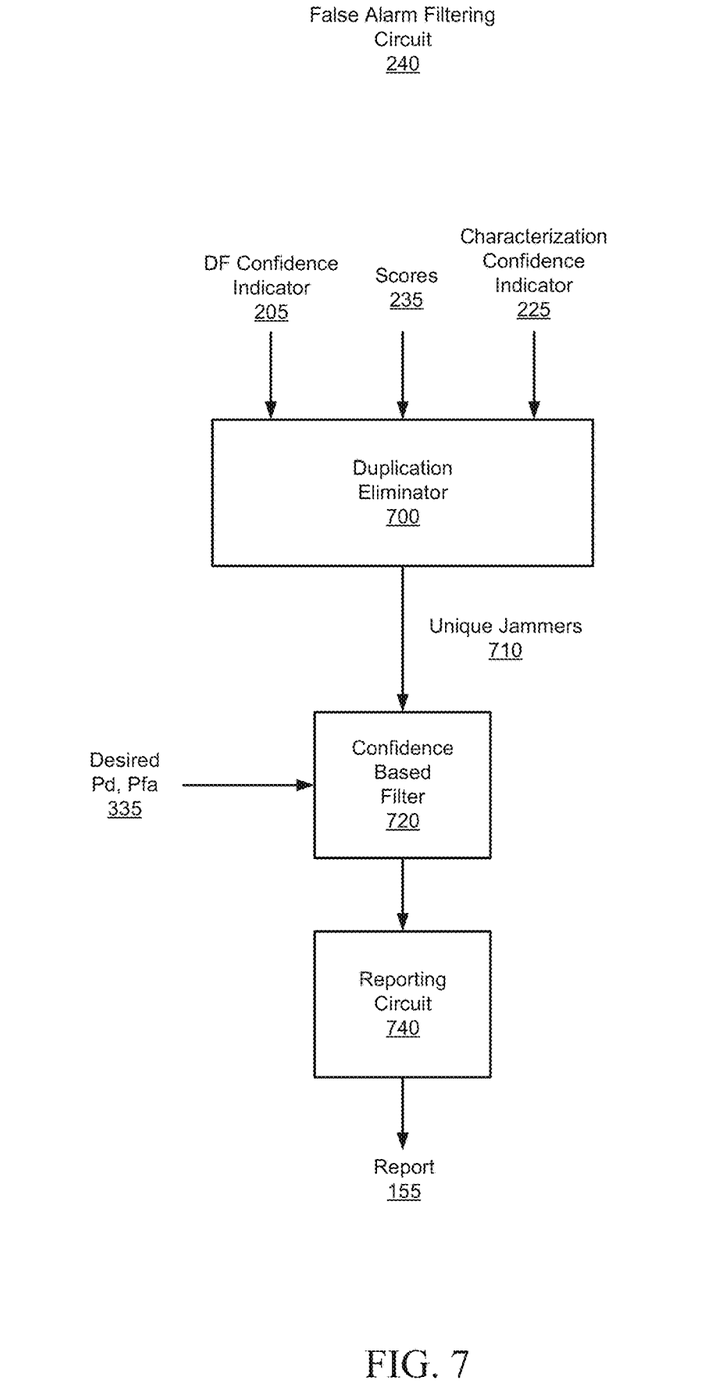
FIG. 7 is a block diagram of the false alarm filtering circuit of FIG. 2, configured in accordance with an embodiment of the present disclosure.

FIG. 7 is a block diagram of the false alarm filtering circuit 240 of FIG. 2, configured in accordance with an embodiment of the present disclosure. The false alarm filtering circuit 240 is shown to include a duplication eliminator 700, a confidence based filter 720, and a reporting circuit 740.

The duplication eliminator 700 is configured to eliminate duplicate jamming signal detections based on the uniqueness assessment. For example, two detections from different directions that are relatively well correlated (based on the correlation scores 235) may be duplicates and the detection with the higher DF confidence 205 and/or characterization confidence 225 may be chosen as the legitimate detection.

The confidence based filter 720 is configured to filter the extracted jamming signal from further jammer consideration processing (although other processing, such as further classification, may be carried out on the signal), based on a comparison of the DF confidence indicator 205 and the characterization confidence indicator 225. In this sense, the confidence based filter 720 can demote an extracted jamming signal from jammer status to non-jammer status. In some cases, the demotion of a given jamming signal to non-jammer status by the confidence based filter 720 causes that jamming signal to be excluded from a report of detected signal jammers. In some such examples, the exclusion or demotion of a given jamming signal to non-jammer status is based on a comparison of the DF confidence indicator 205 to a first threshold and comparison of the characterization confidence indicator 225 to a second threshold. In some such example embodiments, the first and second thresholds are selected based on a desired Pfa and/or a desired Pd.

The reporting circuit 740 is configured to generate a report 155 of the detected jammer signals that were not rejected by the confidence based filter 720. The report may be displayed to an operator of the system, stored for future use, or transmitted to any interested party for further action. In some embodiments, the report may include, for each jammer, the direction of the jammer and/or the characteristics of the jammer. The report 155 may be used to guide adjustments to the various thresholds described above, by the operator or other systems, to achieve a desired Pfa and Pd.

Methodology

Figure 8:
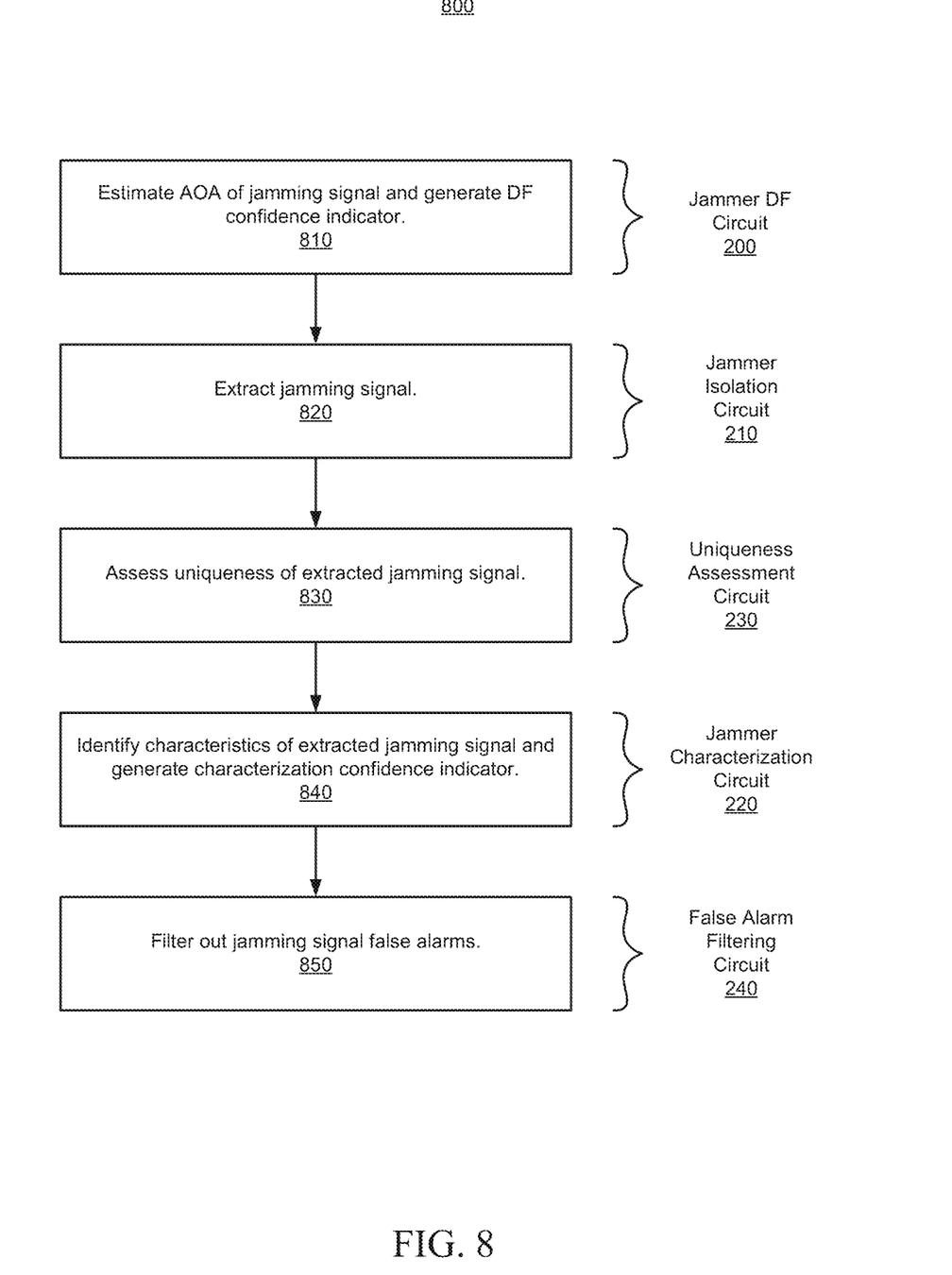
FIG. 8 is a flowchart illustrating a methodology for jammer detection, in accordance with an embodiment of the present disclosure.

FIG. 8 is a flowchart illustrating a methodology 800 for jammer detection with reduced Pfa and improved Pd, in accordance with an embodiment of the present disclosure. As can be seen, example method 800 includes a number of phases and sub-processes, the sequence of which may vary from one embodiment to another. However, when considered in aggregate, these phases and sub-processes form a process for jammer detection, in accordance with certain of the embodiments disclosed herein. These embodiments can be implemented, for example using the system architecture illustrated in FIGS. 1-7, as described above. However other system architectures can be used in other embodiments, as will be apparent in light of this disclosure. To this end, the correlation of the various functions shown in FIG. 8 to the specific components illustrated in FIGS. 1-7, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 800 commences, at operation 810, by estimating a DF angle of arrival of a jamming signal, included in a received signal, and generating a DF confidence indicator associated with the estimated angle of arrival. The angle of arrival may include an azimuth angle and an elevation angle. In some embodiments, a pseudospectrum of the received signal may be generated, and the angle of arrival and associated confidence indicator may be based on frequency tracking and peak detection applied to the pseudospectrum. In some embodiments, the pseudospectrum may be generated by the MUSIC algorithm. A desired Pfa and Pd may be used to guide the frequency tracking and peak detection, as described above.

At operation 820, the jamming signal is extracted from the received signal. In some embodiments, a beamformer steers a beam in the direction of the estimated angle of arrival of the jamming signal to extract the jamming signal.

At operation 830, the extracted jamming signal is correlated with previously extracted jamming signals to generate a correlation score for use as a uniqueness assessment of the extracted jamming signal.

At operation 840, characteristics of the extracted jamming signal are identified, and a characterization confidence indicator is generated. In some embodiments, a spectrogram of the extracted jamming signal is generated and provided to an artificial neural network that has been trained to classify jamming signals to identify characteristics of the extracted jamming signal and to generate a classification score for use as the characterization confidence indicator.

At operation 850, the extracted jamming signal is filtered from a report of detected signal jammers based on factors including one or more of the DF confidence indicator, the uniqueness assessment, and the characterization confidence indicator. In some embodiments, comparison thresholds for these factors may be selected based on a desired Pfa and Pd. More generally, the extracted jamming signal may be excluded from further jammer-based processing, or assigned a status of non-jammer.

In some embodiments, additional operations may be performed, as previously described in connection with the system. These additional operations may include, for example, further classification processing.

Example System

Figure 9:
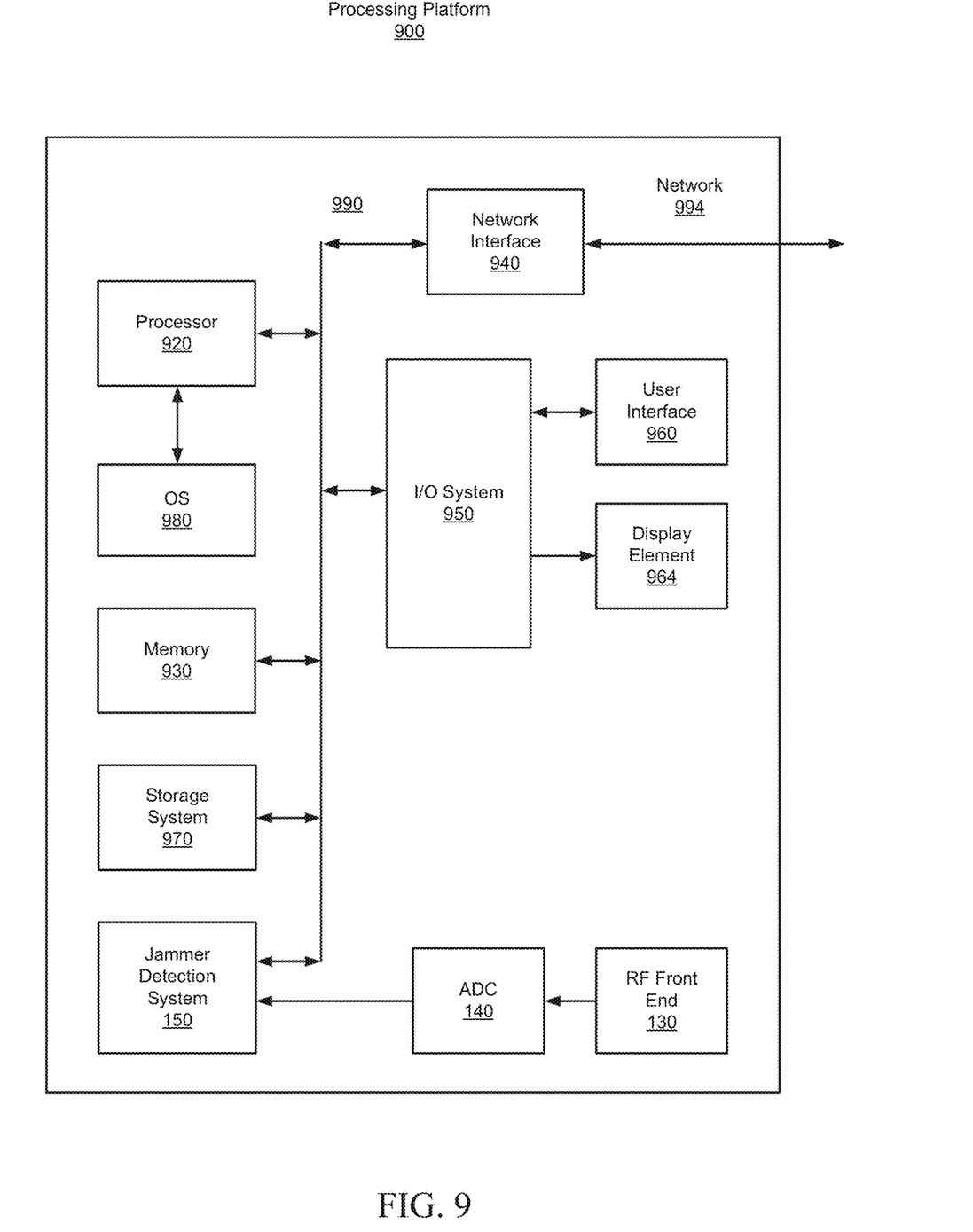
FIG. 9 is a block diagram of a platform for the jammer detection system of FIG. 1, in accordance with certain embodiments of the present disclosure.

FIG. 9 is a block diagram of a processing platform 900 for the jammer detection system of FIG. 1, in accordance with certain embodiments of the present disclosure. In some embodiments, platform 900, or portions thereof, may be hosted on, or otherwise be incorporated into an aircraft, the electronic systems of the aircraft, a ground vehicle, a ship, a tracking ground station, a personal computer, workstation, laptop computer, tablet, touchpad, portable computer, hand-held computer, cellular telephone, smartphone, embedded system, or any other suitable platform where detection of jamming signals is performed. Any combination of different devices may be used in certain embodiments.

In some embodiments, platform 900 may comprise any combination of a processor 920, a memory 930, jammer detection system 150, a network interface 940, an input/output (I/O) system 950, a user interface 960, a display element 964, a storage system 970, an ADC 140, and RF front end 130. As can be further seen, a bus and/or interconnect 990 is also provided to allow for communication between the various components listed above and/or other components not shown. Platform 900 can be coupled to a network 994 through network interface 940 to allow for communications with other computing devices, platforms, devices to be controlled, or other resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or hardware accelerator, to assist in control and processing operations associated with platform 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random-access memory (RAM). In some embodiments, the memory 930 may include various layers of memory hierarchy and/or memory caches. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 900, and therefore may also be implemented using any suitable existing or subsequently-developed platform.

Network interface circuit 940 can be any appropriate network chip or chipset which allows for wired and/or wireless connection between other components of platform 900 and/or network 994, thereby enabling platform 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of platform 900. I/O devices may include, but not be limited to, user interface 960 and display element 964. User interface 960 may include devices (not shown) such as a touchpad, keyboard, and mouse, etc., for example, to allow the user to control the system. Display element 964 may be configured to display jammer detection results, tracking data, navigation data, camera images, or other suitable information. I/O system 950 may include a graphics subsystem configured to perform processing of images for rendering on the display element 964. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 900.

It will be appreciated that in some embodiments, the various components of platform 900 may be combined or integrated in a system-on-a-chip (SoC) architecture. In some embodiments, the components may be hardware components, firmware components, software components or any suitable combination of hardware, firmware or software.

Jammer detection system 150 is configured to detect jammers with reduced Pfa and improved Pd, as described previously. Jammer detection system 150 may include any or all of the circuits/components illustrated in FIGS. 1-7, as described above. These components can be implemented or otherwise used in conjunction with a variety of suitable software and/or hardware that is coupled to or that otherwise forms a part of platform 900. These components can additionally or alternatively be implemented or otherwise used in conjunction with user I/O devices that are capable of providing information to, and receiving information and commands from, a user.

In some embodiments, these circuits may be installed local to platform 900, as shown in the example embodiment of FIG. 9. Alternatively, platform 900 can be implemented in a client-server arrangement wherein at least some functionality associated with these circuits is provided to platform 900 using an applet, such as a Java applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, platform 900 may be implemented as a wireless system, a wired system, or a combination of both. When implemented as a wireless system, platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductor), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a system for detection of signal jammers comprising: a jammer direction finding (DF) circuit configured to estimate an angle of arrival of a jamming signal, the jamming signal included in a received signal, and to generate a DF confidence indicator associated with the estimated angle of arrival; a jammer isolation circuit configured to extract the jamming signal from the received signal; a uniqueness assessment circuit configured to correlate the extracted jamming signal with previously extracted jamming signals to generate a correlation score; a jammer characterization circuit configured to identify characteristics of the extracted jamming signal, and to generate a characterization confidence indicator; and a false alarm filtering circuit configured to demote the extracted jamming signal to a non-jammer status based on one or more of the DF confidence indicator, the uniqueness assessment, and the characterization confidence indicator.

Example 2 includes the system of Example 1, wherein the jammer DF circuit comprises a pseudospectrum generator configured to generate a pseudospectrum of the jamming signal based on execution of a multiple signal classification (MUSIC) process.

Example 3 includes the system of Example 2, wherein the jammer DF circuit comprises a frequency tracker configured to track frequencies of the jamming signal in the pseudospectrum, and a DF confidence estimator configured to generate the DF confidence indicator based on the frequency tracking.

Example 4 includes the system of Example 2, wherein the jammer DF circuit comprises a peak detector configured to detect peaks in the pseudospectrum, and a DF confidence estimator configured to generate the DF confidence indicator based on comparison of the detected peaks to a peak threshold value, the peak threshold value selected based on a desired probability of false alarm (Pfa) and/or a desired probability of detection (Pd).

Example 5 includes the system of any of Example 1-4, wherein the jammer isolation circuit comprises a beamformer configured to steer a beam in a direction of the estimated angle of arrival of the jamming signal to extract the jamming signal.

Example 6 includes the system of any of Example 1-5, wherein the jammer characterization circuit comprises: a spectrogram generator configured to generate a spectrogram of the extracted jamming signal; and a neural network configured to classify the extracted jamming signal, based on the spectrogram, to identify the characteristics of the extracted jamming signal, and to generate a classification score for use as the characterization confidence indicator.

Example 7 includes the system of any of Example 1-6, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

Example 8 is a computer program product including one or more machine-readable mediums encoded with instructions that when executed by one or more processors cause a process to be carried out for detection of signal jammers, the process comprising: estimating an angle of arrival of a jamming signal, the jamming signal included in a received signal, and generating a direction finding (DF) confidence indicator associated with the estimated angle of arrival; extracting the jamming signal from the received signal; correlating the extracted jamming signal with previously extracted jamming signals to generate a correlation score; identifying characteristics of the extracted jamming signal, and generating a characterization confidence indicator; and filtering the extracted jamming signal from a report of detected signal jammers based on one or more of the DF confidence indicator, the uniqueness assessment, and the characterization confidence indicator.

Example 9 includes the computer program product of Example 8, wherein the process further comprises generating a pseudospectrum of the jamming signal based on execution of a multiple signal classification (MUSIC) algorithm.

Example 10 includes the computer program product of Example 9, wherein the process further comprises tracking frequencies of the jamming signal in the pseudospectrum and generating the DF confidence indicator based on the frequency tracking.

Example 11 includes the computer program product of Example 9, wherein the process further comprises detecting peaks in the pseudospectrum and generating the DF confidence indicator based on comparison of the detected peaks to a peak threshold value, the peak threshold value selected based on a desired probability of false alarm (Pfa) and/or a desired probability of detection (Pd).

Example 12 includes the computer program product of any of Examples 8-11, wherein the process further comprises steering a beam in a direction of the estimated angle of arrival of the jamming signal to extract the jamming signal.

Example 13 includes the computer program product of any of Examples 8-12, wherein the process further comprises: generating a spectrogram of the extracted jamming signal; and employing a neural network configured to classify the extracted jamming signal, based on the spectrogram, to identify the characteristics of the extracted jamming signal, and to generate a classification score for use as the characterization confidence indicator.

Example 14 includes the computer program product of any of Examples 8-13, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

Example 15 is a method for detection of signal jammers, the method comprising: estimating, by a processor based system, an angle of arrival of a jamming signal, the jamming signal included in a received signal, and generating a direction finding (DF) confidence indicator associated with the estimated angle of arrival; extracting, by the processor based system, the jamming signal from the received signal; correlating, by the processor based system, the extracted jamming signal with previously extracted jamming signals to generate a correlation score; identifying, by the processor based system, characteristics of the extracted jamming signal, and generating a characterization confidence indicator; and filtering, by the processor based system, the extracted jamming signal from a report of detected signal jammers based on one or more of the DF confidence indicator, the uniqueness assessment, and the characterization confidence indicator.

Example 16 includes the method of Example 15, further comprising generating a pseudospectrum of the jamming signal based on execution of a multiple signal classification (MUSIC) algorithm.

Example 17 includes the method of Example 16, wherein the process further comprises: tracking frequencies of the jamming signal in the pseudospectrum and generating the DF confidence indicator based on the frequency tracking; and detecting peaks in the pseudospectrum and generating the DF confidence indicator further based on comparison of the detected peaks to a peak threshold value, the peak threshold value selected based on a desired probability of false alarm (Pfa) and/or a desired probability of detection (Pd).

Example 18 includes the method of any of Examples 15-17, wherein the process further comprises steering a beam in a direction of the estimated angle of arrival of the jamming signal to extract the jamming signal.

Example 19 includes the method of any of Examples 15-18, wherein the process further comprises: generating a spectrogram of the extracted jamming signal; and employing a neural network configured to classify the extracted jamming signal, based on the spectrogram, to identify the characteristics of the extracted jamming signal, and to generate a classification score for use as the characterization confidence indicator.

Example 20 includes the method of any of Examples 15-19, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for detection of signal jammers, the system comprising:
a jammer direction finding (DF) circuit configured to estimate an angle of arrival of a jamming signal, the jamming signal included in a received signal, and to generate a DF confidence indicator associated with the estimated angle of arrival;
a jammer isolation circuit configured to extract the jamming signal from the received signal;

a uniqueness assessment circuit configured to correlate the extracted jamming signal with previously extracted jamming signals to generate a correlation score;

a jammer characterization circuit configured to identify characteristics of the extracted jamming signal, and to generate a characterization confidence indicator; and a false alarm filtering circuit configured to demote the extracted jamming signal to a non-jammer status based on one or more of the DF confidence indicator, the uniqueness assessment, and the characterization confidence indicator.

2. The system of claim 1, wherein the jammer DF circuit comprises a pseudospectrum generator configured to generate a pseudospectrum of the jamming signal based on execution of a multiple signal classification (MUSIC) process.

3. The system of claim 2, wherein the jammer DF circuit comprises a frequency tracker configured to track frequencies of the jamming signal in the pseudospectrum, and a DF confidence estimator configured to generate the DF confidence indicator based on the frequency tracking.

4. The system of claim 2, wherein the jammer DF circuit comprises a peak detector configured to detect peaks in the pseudospectrum, and a DF confidence estimator configured to generate the DF confidence indicator based on comparison of the detected peaks to a peak threshold value, the peak threshold value selected based on a desired probability of false alarm (Pfa) and/or a desired probability of detection (Pd).

5. The system of claim 1, wherein the jammer isolation circuit comprises a beamformer configured to steer a beam in a direction of the estimated angle of arrival of the jamming signal to extract the jamming signal.

6. The system of claim 1, wherein the jammer characterization circuit comprises:

a spectrogram generator configured to generate a spectrogram of the extracted jamming signal; and a neural network configured to classify the extracted jamming signal, based on the spectrogram, to identify the characteristics of the extracted jamming signal, and to generate a classification score for use as the characterization confidence indicator.

7. The system of claim 1, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

8. A computer program product including one or more non-transitory machine-readable mediums encoded with instructions that when executed by one or more processors cause a process to be carried out for detection of signal jammers, the process comprising:

estimating an angle of arrival of a jamming signal, the jamming signal included in a received signal, and generating a direction finding (DF) confidence indicator associated with the estimated angle of arrival;

extracting the jamming signal from the received signal;

correlating the extracted jamming signal with previously extracted jamming signals to generate a correlation score;

identifying characteristics of the extracted jamming signal, and generating a characterization confidence indicator; and filtering the extracted jamming signal from a report of detected signal jammers based on one or more of the DF confidence indicator, the uniqueness assessment, and the characterization confidence indicator.

9. The computer program product of claim 8, wherein the process further comprises generating a pseudospectrum of the jamming signal based on execution of a multiple signal classification (MUSIC) algorithm.

10. The computer program product of claim 9, wherein the process further comprises tracking frequencies of the jamming signal in the pseudospectrum and generating the DF confidence indicator based on the frequency tracking.

11. The computer program product of claim 9, wherein the process further comprises detecting peaks in the pseudospectrum and generating the DF confidence indicator based on comparison of the detected peaks to a peak threshold value, the peak threshold value selected based on a desired probability of false alarm (Pfa) and/or a desired probability of detection (Pd).

12. The computer program product of claim 8, wherein the process further comprises steering a beam in a direction of the estimated angle of arrival of the jamming signal to extract the jamming signal.

13. The computer program product of claim 8, wherein the process further comprises:

generating a spectrogram of the extracted jamming signal; and employing a neural network configured to classify the extracted jamming signal, based on the spectrogram, to identify the characteristics of the extracted jamming signal, and to generate a classification score for use as the characterization confidence indicator.

14. The computer program product of claim 8, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

15. A method for detection of signal jammers, the method comprising:

estimating, by a processor based system, an angle of arrival of a jamming signal, the jamming signal included in a received signal, and generating a direction finding (DF) confidence indicator associated with the estimated angle of arrival;

extracting, by the processor based system, the jamming signal from the received signal;

correlating, by the processor based system, the extracted jamming signal with previously extracted jamming signals to generate a correlation score;

identifying, by the processor based system, characteristics of the extracted jamming signal, and generating a characterization confidence indicator; and filtering, by the processor based system, the extracted jamming signal from a report of detected signal jammers based on one or more of the DF confidence indicator, the uniqueness assessment, and the characterization confidence indicator.

16. The method of claim 15, further comprising generating a pseudospectrum of the jamming signal based on execution of a multiple signal classification (MUSIC) algorithm.

17. The method of claim 16, wherein the process further comprises:

tracking frequencies of the jamming signal in the pseudospectrum and generating the DF confidence indicator based on the frequency tracking; and detecting peaks in the pseudospectrum and generating the DF confidence indicator further based on comparison of the detected peaks to a peak threshold value, the peak threshold value selected based on a desired probability of false alarm (Pfa) and/or a desired probability of detection (Pd).

18. The method of claim 15, wherein the process further comprises steering a beam in a direction of the estimated angle of arrival of the jamming signal to extract the jamming signal.

19. The method of claim 15, wherein the process further comprises:
generating a spectrogram of the extracted jamming signal; and
employing a neural network configured to classify the extracted jamming signal, based on the spectrogram, to identify the characteristics of the extracted jamming signal, and to generate a classification score for use as the characterization confidence indicator.

20. The method of claim 15, wherein the filtering of the extracted jamming signal is based on a comparison of the DF confidence indicator to a first threshold and comparison of the characterization confidence indicator to a second threshold, wherein the first and second thresholds are selected based on a desired Pfa and/or a desired Pd.

* * * * *